United States Patent
Agostinelli et al.

(10) Patent No.: US 7,174,029 B2
(45) Date of Patent: Feb. 6, 2007

(54) METHOD AND APPARATUS FOR AUTOMATIC SELECTION AND PRESENTATION OF INFORMATION

(76) Inventors: John A. Agostinelli, Eastman Kodak Company, 343 State St., Rochester, NY (US) 14650; Richard A. Simon, Eastman Kodak Company, 343 State St., Rochester, NY (US) 14650

(*) Notice: Subject to any disclaimer, the term of this patent is extended or adjusted under 35 U.S.C. 154(b) by 694 days.

(21) Appl. No.: 10/000,886

(22) Filed: Nov. 2, 2001

(65) Prior Publication Data

US 2003/0088832 A1    May 8, 2003

(51) Int. Cl.
  G06K 9/00      (2006.01)
  G06F 17/00     (2006.01)
  G06F 15/18     (2006.01)

(52) U.S. Cl. .................. 382/100; 707/104.1; 705/500; 706/8

(58) Field of Classification Search ........ 717/100–106, 717/109, 113; 706/1; 345/625, 634
See application file for complete search history.

(56) References Cited

U.S. PATENT DOCUMENTS

| | | | |
|---|---|---|---|
| 5,267,348 A | 11/1993 | Someya et al. | |
| 5,481,712 A * | 1/1996 | Silver et al. | 717/109 |
| 5,504,675 A | 4/1996 | Cragun et al. | |
| 5,781,650 A | 7/1998 | Lobo et al. | |
| 5,802,256 A | 9/1998 | Heckerman et al. | |
| 5,953,701 A | 9/1999 | Neti et al. | |
| 5,966,696 A | 10/1999 | Giraud | |
| 6,035,288 A | 3/2000 | Solomon | |
| 6,061,602 A * | 5/2000 | Meyer | 700/83 |
| 6,076,083 A | 6/2000 | Baker | |
| 6,111,517 A * | 8/2000 | Atick et al. | 340/5.83 |
| 6,167,562 A * | 12/2000 | Kaneko | 717/109 |
| 6,282,526 B1 | 8/2001 | Ganesh | |
| 6,298,474 B1 * | 10/2001 | Blowers et al. | 717/104 |
| 6,336,210 B1 * | 1/2002 | Taima et al. | 717/100 |
| 6,405,364 B1 * | 6/2002 | Bowman-Amuah | 717/101 |
| 6,535,227 B1 * | 3/2003 | Fox et al. | 345/736 |
| 6,637,022 B1 * | 10/2003 | Weeren et al. | 717/109 |
| 6,763,515 B1 * | 7/2004 | Vazquez et al. | 717/109 |
| 6,795,808 B1 * | 9/2004 | Strubbe et al. | 704/275 |
| 6,795,831 B2 * | 9/2004 | Hirose et al. | 707/201 |
| 7,006,881 B1 * | 2/2006 | Hoffberg et al. | 700/83 |

OTHER PUBLICATIONS

U.S. Appl. No. 09/467,235 filed Dec. 20, 1999, Entitled: Pictorial Display Device With Directional Audio, John Agostinelli and William Archie, Jr.

"Real-Time Face Pose Estimation", S. J. McKenna and S. Gong, International Journal on Real Time Imaging, vol. 4, pp. 333-347, 1998.

(Continued)

Primary Examiner—Antony Nguyen-Ba
(74) Attorney, Agent, or Firm—Thomas J. Strouse

(57) ABSTRACT

A system and method for the display of advertising information is provided wherein the system is able to sense the presence and obtain characteristics of individuals in the immediate environment of the display. The system then selects a specific informational content/program to improve the effectiveness of the display device based upon the obtained characteristics of one or more sensed individuals.

20 Claims, 4 Drawing Sheets

OTHER PUBLICATIONS

"The Use of Airborne Ultrasonics for Generating Audible Sound Beams", F. Joseph Pompei, J. Audio Eng. Soc., vol. 47, No. 9, Sep. 1999, pp. 726-731.

Gender Classification With Support Vector Machines; Baback Moghaddam et al.; Proc of 4th IEEE International Conf. on Face and Gesture Recognition.

* cited by examiner

METHOD AND APPARATUS FOR AUTOMATIC SELECTION AND PRESENTATION OF INFORMATION

FIELD OF THE INVENTION

The present invention relates to a method and system for the presentation of informational material such as sales promotions and advertisements. In particular, the present invention relates to the automatic selection and presentation of the aforementioned informational material in real-time, based upon awareness of the current operating environment and the classification of the individual(s) viewing the informational material.

BACKGROUND OF THE INVENTION

Advertising delivers messages designed to motivate an individual to take a desired action, which typically is to make a product purchase. The goal of advertising is to attract the attention of persons who might take the desired action, hold their attention while the program of messaging is presented, and motivate such persons to take the desired action. Empirical evidence suggests that advertising that is more successful at attracting and holding the attention of persons is also more successful at motivating persons to take the desired action, such as making a purchase. In addition, targeting the advertisement to the appropriate audience can increase the effectiveness of producing the desired action, such as making a purchase.

In general, it is difficult to develop a single advertisement that can attract and hold the attention of the full range of potential viewers. Many different factors have been found to influence the success of an advertisement and therefore to suggest the best program content. Products are often useful to and therefore are targeted to a particular demographic group. More broadly useful products are targeted in the way that they are advertised to different demographic groups. The timing of the presentation as to time of day, week, year, and the like can also influence the success of a program. Known traffic and environment in the intermediate area around a presentation unit can be used to affect the success of a program. Similarly, the geographic region, current local season or weather may influence the response of persons to a program. In addition, knowing the characteristics, such as gender, age, etc., of the individual can be used to tailor the advertisement to generate a more effective advertisement. Thus, it has been found preferable to provide a number of advertisements, each potentially having features that are adapted for different factors. The selection of programs to be offered to individuals typically is done by analyzing collected data comprising sales of the promoted products, the number of persons interacting with the presentation unit, a count of casual individuals/observers, or some combination of such performance characteristics.

Although electronic billboards and other forms of active advertising devices are known, a shortcoming that presently exists relates to the inability to automatically accurately target an advertisement to the appropriate audience. Known advertising devices operate by projecting advertising information at large, regardless of the presence or absence and without any knowledge of characteristics of the recipients of this information. Simply issuing advertising information according to some predetermined program is not the most effective way of reaching potential consumers and impacting the market for the product being promoted.

In U.S. Pat. No. 5,966,696, Giraud discloses an active system that tracks consumer exposure to a number of different advertisements and exposes the consumer to several different advertisements. The system is able to count the number of people who look in the direction of a specific advertisement within a specified distance from that advertisement. The system thus offers a means to do accounting relative to the number of people who saw a given advertisement. In U.S. Pat. No. 5,504,675, Cragun et al. disclose an active system that automatically selects a sales promotion program from among a plurality of programs using a neutral network. The goal of the system of the '675 patent is to choose an advertisement that has the greatest likelihood of success in arousing the interest of a viewer in the intermediate area of the presentation unit. A limitation of both of these systems is that they don't take into account the characteristics of the individual in determining the advertisement presented to the individual.

Thus there is a need to provide a system that permits the real-time selection of informational material for presentation and availability to individuals based upon current contributing conditions and the characteristics (such as demographics, psychographics, cohort group, identity, etc.) of the individual(s) obtained by non-obtrusive data gathering. The present invention solves the problem of targeting the informational material to the customer and thus increases the effectiveness of this information in reaching potential consumers.

The prior art also fails to provide a method for the display of advertising information wherein an advertising display device/system is able to sense the presence and obtain characteristics of individuals in the immediate environment and select a specific advertising content/program to improve the effectiveness of the display device based upon the obtained characteristics of one or more sensed individuals.

It is also desirable to provide an environment-aware display system comprising a display means to display information, a sensing means to detect one or more individuals and identify characteristics of the one or more individuals, and a programmed processor to select advertising information based upon the sensed characteristics of the one or more individuals.

There is also a need in the prior art to providean environment-aware display system optionally includes a connection to a network so that advertising information content and processor programming instructions can be downloaded remotely.

The prior art also fails to integrate sales (e.g. local cash register) information with the environment-aware display system so that sales data may form an input to the programmed processor.

SUMMARY OF THE INVENTION

In accordance with one aspect of the present invention there is provided a method for selecting an informational material program from a plurality of the informational programs available in a presentation system, comprising the following steps:

a) sensing the presence of at least one individual in a predetermined area;

b) determining at least one characteristic of the at least one individual;

c) selecting one of the plurality of informational material programs based upon the determined of at least one characteristic; and d) presenting the selected informational material program by the system.

In accordance with another aspect of the present invention there is provided a method for selecting an informational material program from a plurality of the informational programs available in a presentation system, comprising the following steps:

a) sensing the presence of at least one individual in a predetermined area;

b) determining at least one characteristic of the individual;

c) selecting one of the plurality of informational material programs based upon the at least one characteristic of the at least one individual and other information; and d) presenting the selected informational material program on a display unit.

In accordance with yet another aspect of the present invention there is provided a system for displaying an informational material program selected from a plurality of informational material programs based upon a characteristic of an individual, consisting of:

a) a control unit storing the plurality of programs;

b) a display unit capable of displaying the informational material programs, c) one or more sensors for determining the presence of an individual in a predetermined area and for determining a characteristic of the individual; and d) the control unit selecting one of the plurality of informational material programs based upon the presence and the determined characteristic of the individual in the predetermined area.

In accordance with still another aspect of the present invention there is provided a software program for selecting an informational material program from a plurality of the informational programs available in a presentation system such that when loaded on a computer will cause the computer to do the steps of:

a) sensing the presence of at least one individual in a predetermined area;

b) determining at least one characteristic of the at least one individual;

c) selecting one of the plurality of informational material programs based upon the determined at least one characteristic; and d) presenting the selected informational material program by the system.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Throughout the following detailed description of the present invention, the term "sentient" system will be employed to refer to an electronic display system which is able to sense the presence of individuals and obtain at least one characteristic of these individuals within the immediate environment of the display system. The sentient system selects specific content for presentation based upon the sensed characteristics of one or more of these individuals to improve the effectiveness of the display.

Figure 1:
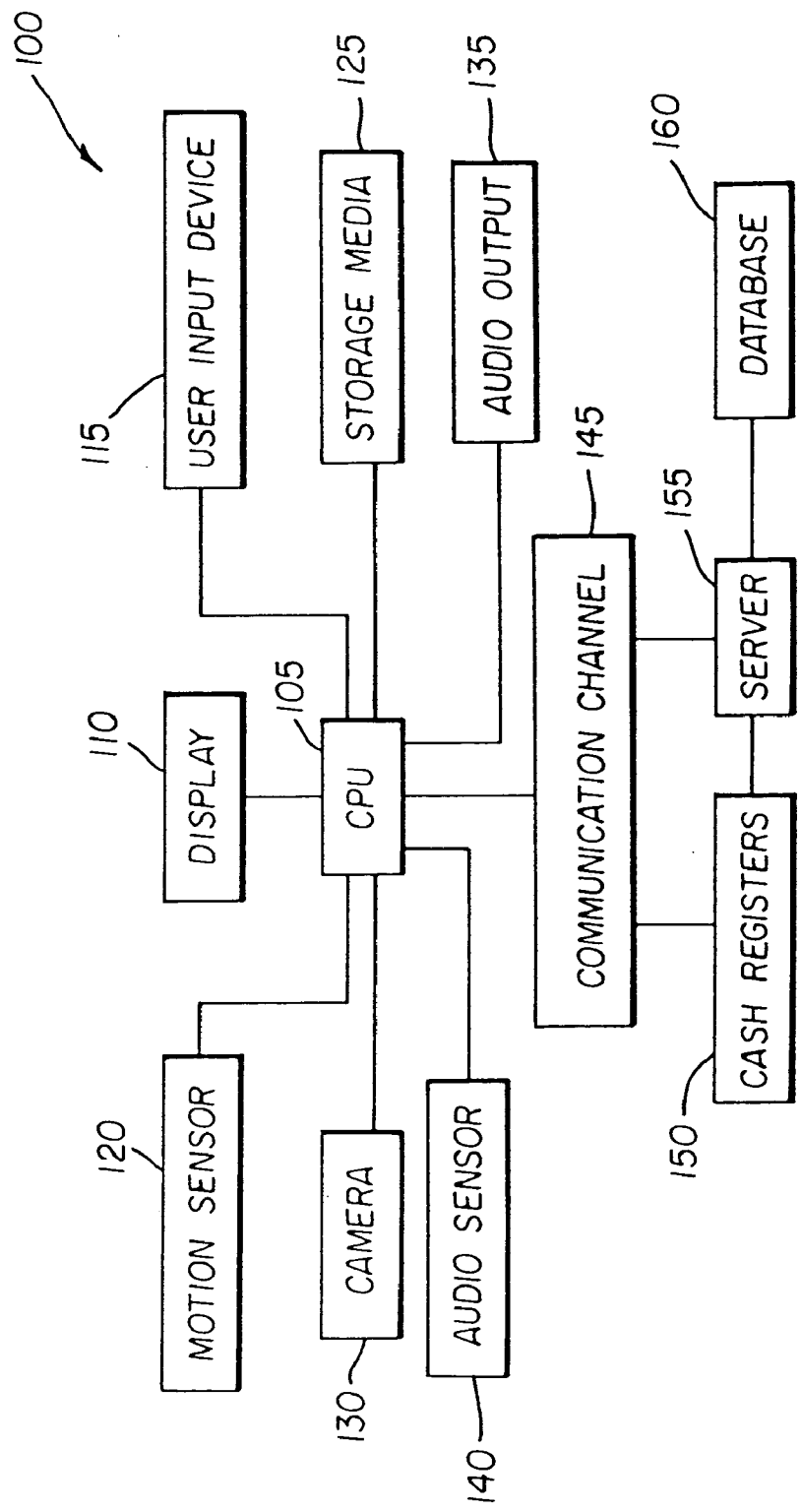
FIG. 1 is a system block diagram showing the major components of the present invention.

FIG. 1 presents a block diagram of a sentient system 100 that is particularly useful in practicing the present invention. In the particular embodiment illustrated the system 100 is designed to provide advertising display programs. The system 100 includes a central processing unit (CPU) 105 that can execute a set of predefined algorithms in carrying out the method of the present invention. The system 100 includes a display device 110 for displaying of still and/or motion images. In the particular embodiment illustrated device 110 is a flat panel display. However, it is to be understood that display device 110 may comprise any type of electronic display suitable for the display of pictorial information that could be employed in the system 100. Display device 110 is appropriately connected to the CPU 105 and has the capability to display the informational material provided by CPU 105. An electronic storage medium 125 is also provided in the system 100 for storing data that is necessary for carrying out the present invention. The storage media 125 may comprise any one of many different types of removable and non-removable memory devices, such as RAM, ROM, hard and floppy or CD drives or videotape. The system 100 in the particular embodiment illustrated also contains one or more motion sensors 120 that are used to sense the presence of individuals in a predetermined area. The predetermined area is typically the area surrounding the system 100. Motion sensors useful for system 100 could be of the infrared ranging type, or sonar ranging type. Pressure sensitive sensors in a floor mat in front of or in the immediate area of the system 100 could also be used to detect the presence of an individual. The system 100 in the embodiment illustrated also contains one or more image capture devices 130 such as a digital camera. The image capture devices are used to capture digital images of individual(s) that are detected in the predetermined area. These digital images are used in a classification step to classify the characteristics of the individuals (as described in detail later herein). If more than one digital image capture device 130 is employed, these digital image capture devices may be aimed at the predetermined area from more than one angle, or may be fitted with lenses of differing focal length in order to provide differing fields of view. The use of multiple image capture devices increases the probability that an image useful for classification, such as a frontal close-up view of the individual's face will be captured. The digital image capture devices themselves can also be used to sense when an individual is in the predetermined area. In order to accomplish this, a change detection algorithm can be installed on CPU 105 that enables the system 100 to detect whenever an individual enters the field of view of one or more of the image capture devices.

The system 100 can also include a user-input device 115, such as a keyboard, that allows the user to interact with the system 100 so that the user can obtain additional information as desired. Alternatively, various other user input devices may be utilized; for example, but not limited to, a touch screen display can be used in place of display 110 or a computer mouse can be used as a user input device 115. Other user input devices 115 may include means for an individual to swipe a loyalty card having a magnetic storage stripe, or means to recognize an RF identification tag, such as the well-known "Speedpass" type identification device whereby an individual can be recognized and/or an individual's account may be automatically accessed. Once a specific individual has been recognized by the system 100, informational or promotional material may be selected for presentation to the individual, as is typically done in a customer loyalty program, solely on the basis of accessing stored information about the individual, such as past buying patterns.

In the embodiment illustrated the system 100 also contains means for obtaining audio input and providing audio output. Audio input device 140 such as a microphone can be used to record the voice of the individuals interacting with the system. Input device 140 obtains audio data that can be used for analysis of voices in the environment and aid in the classification of the individual. Audio output devices 135, such as speakers, can be used to communicate audio information back to the individual. The audio output device could be either omnidirectional speakers or preferably a highly directional audio output device such as the Audio Spotlight© sound system (Pompel, F. J., J. Audio Eng. Soc., V47, 726–731 (1999) Commonly assigned and copending U.S. patent application Ser. No. 09/467,235 discloses the use of the Audio Spotlight© in combination with an advertising display. By aiming the Audio Spotlight© at the predetermined area, the individual(s) present will her the audio message only when in the predetermined area. The Audio Spotlight© system can also be dynamically aimed towards an individual in the vicinity of the system. This feature of a system 100 is particularly desirable in that it cuts down on the potential for "noise pollution" in what may be an already crowded and noisy area, such as a shopping area. The directional sound system also more clearly communicates the audio portion of a targeted message in an area where many messages may be competing for the attention of the individual observing them. Finally, the presence of a directional sound system itself can, due to its novelty alone, function as attractor by capturing the attention of individuals as they walk into the predetermined area in which the sentient system 100 can then classify the individuals.

The CPU 105 can be connected to a server 155 via a communication channel/network 145, which is connected to a database 160 of information for presentation to individuals viewing the display device 110. Communication channel 145 is preferably a standard communication interface such as Ethernet. The channel 145 could also be established by wireless connectivity. Database 160 can contain information that is subject to frequent change such as sales promotional data and the informational material that is played by the sentient system 100. Informational material, such as an advertising program, may be presented in various modes to an individual viewing a sentient display. In a basic mode, static visual information alone or static visual information along with a simple text-based audio message is selected based upon a determined characteristic of the individual observing the display 110 and the current operating conditions. In a more complex mode of operation, a multimedia informational presentation consisting of video and/or stills and the accompanying audio information including both text and music is tailored to the individual observing the display 110.

Information relating to the current operating condition that can influence the program to be run on system 100 may be obtained from a variety of sources. One example of an information input source may be at the local cash registers 150 in the business establishment or related area may also be connected to the sentient system 100 so that sales data can also be incorporated as part of the information used by the system 100. Cash registers 150 may be linked into the system 100 via the server 155 or directly to the CPU 105 via the communication channel 145.

Figure 2:
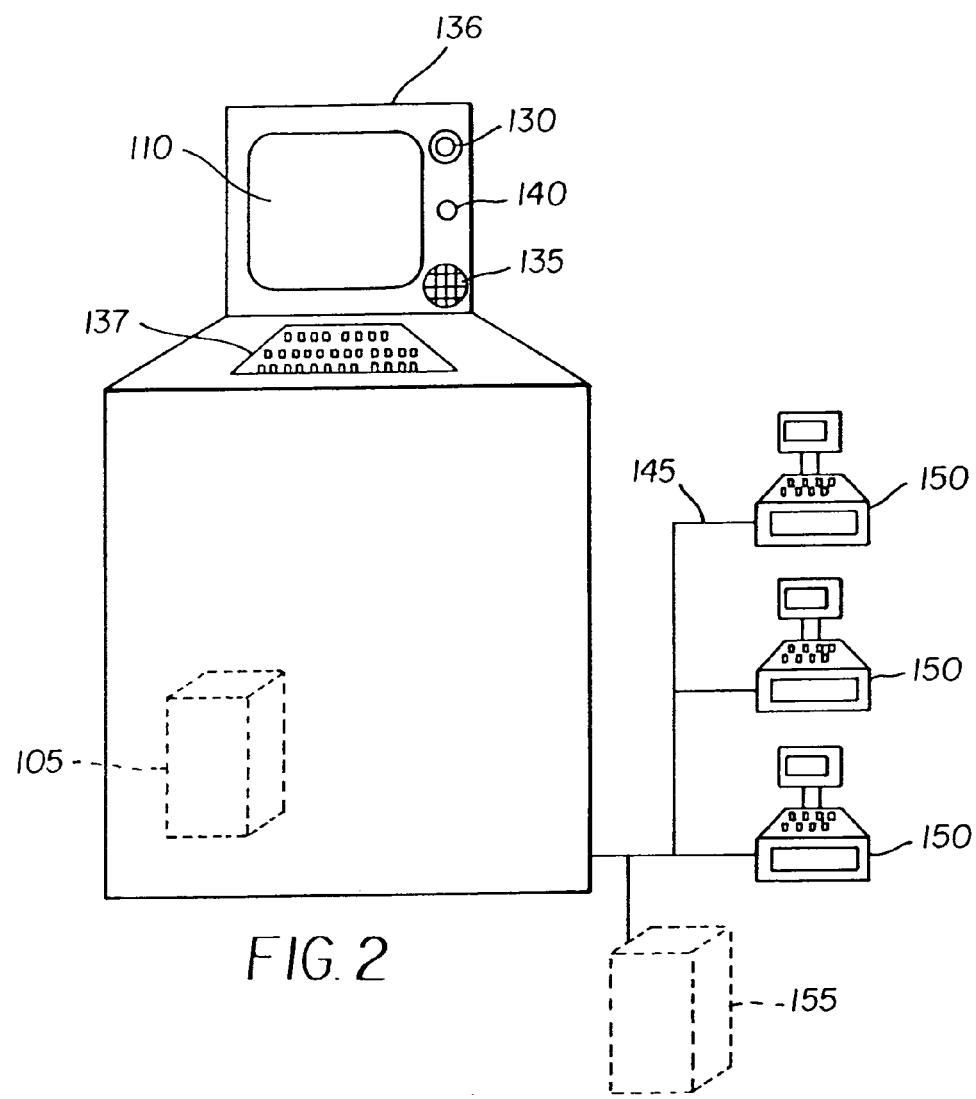
FIG. 2 illustrates a specific embodiment of the present invention.

In one embodiment of the present invention, many of the components of the system 100 shown in FIG. 1, including, for example, the display device 110, optional audio sensor(s) 140, camera(s) 130, and audio output device 135 are housed within a kiosk 136 (see FIG. 2). A server 155 and other information input devices, for example such as cash registers 150, may be connected to the kiosk via the communication channel 145. In kiosk 136, a limited number of individuals can interact and/or view the informational/product material on display device 110. Kiosk 136 is designed more for informational applications where a user may approach the kiosk 136 to get specific information about a given subject. In such an embodiment, the kiosk could be programmed to more effectively sell products and/or present ideas by using sensed characteristics of the interacting individual(s). Kiosk 136 could also be made interactive with the individual/user. Once an individual has been detected in the vicinity of the kiosk 136, and has been classified, an appropriate informational presentation is selected and presented. The kiosk may begin to operate in an interactive mode where additional input from the individual is sought. Input could also be provided, for example as mentioned earlier, via a keyboard. At this point, the kiosk 136 ceases to be purely a device for the presentation of information and becomes an "automatic salesperson". U.S. Pat. No. 6,035,288 issued to Solomon is incorporated herein by reference and discloses a computer-implemented system where simulated human merchants present goods for sale and negotiate with customers regarding purchase. The system of the '288 patent comprises a database of simulated merchant character data, means for receiving input from a customer regarding purchase of goods/services, a processing engine which utilizes the merchant character data and the data inputted by a customer to generate responses to the customer. The system of the '288 patent was disclosed for use on the internet, but could easily be adapted to the environment of a kiosk.

Figure 3:
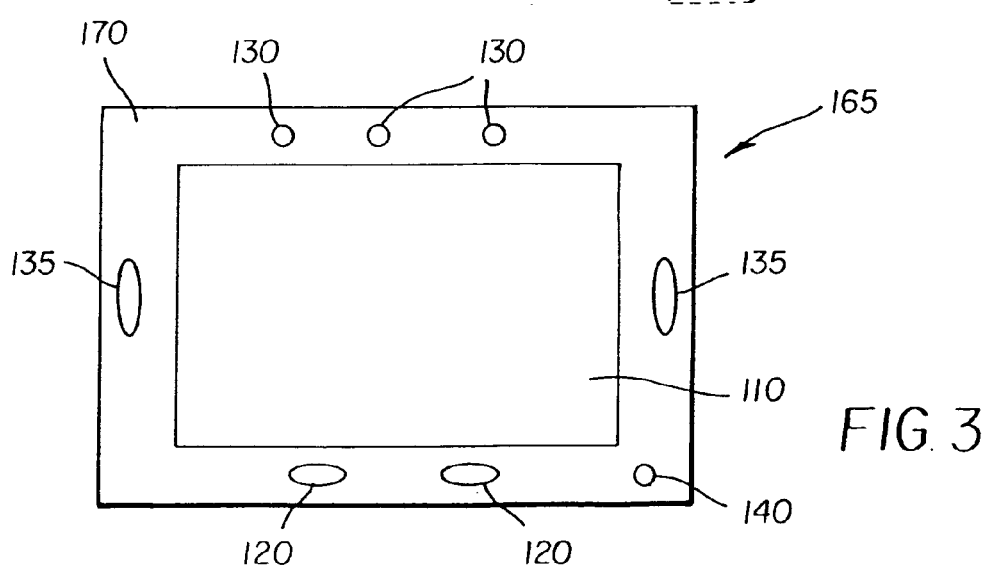
FIG. 3 illustrates another specific embodiment of the present invention.

FIG. 3 illustrates another embodiment of a sentient system which may be envisioned as an electronic billboard/display device 165 where a relatively large number of individuals can view the informational material and interact with the system. The electronic billboard 165 is composed of a display device 110 and a frame 170 for supporting device 110. The display device 110 preferably is a flat panel display (such as a liquid crystal display, plasma display, or organic light emitting display OLED) but could comprise any electronic display suitable for the presentation of pictorial imagery, either still or motion. For the electronic billboard 165 embodiment, the display device 110 is large enough so that potentially many individual(s) can see the information being displayed, even from a relatively long distance. In addition, a large display is useful in attracting attention to the sentient display system 100. The frame 170 contains one or more motion sensors 120 and one or more digital image capture devices 130 such as a digital video camera. The frame could also have an audio input device 140 such as a microphone and audio output devices 135.

Figure 4:
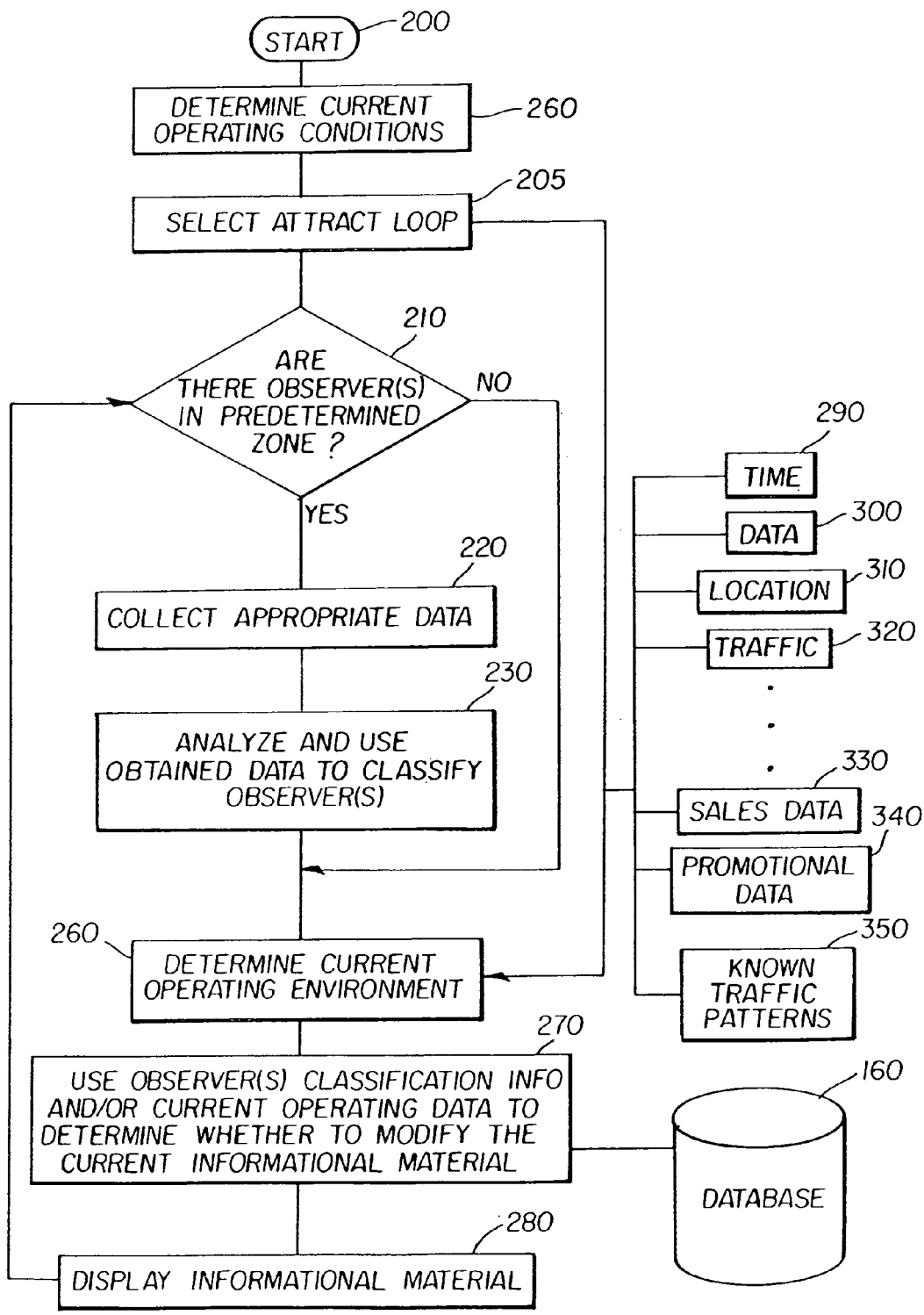
FIG. 4 is a flow chart showing the steps to be carried out in the practice of the present invention.

Turning now to FIG. 4, there is shown a flow chart of the steps in the operation of a sentient advertising display system 100 according to the present invention. When the system 100 first starts up at step 200, current operating condition data 260 (as described in detail later herein) is used to select in step 205 an appropriate attract loop (presentation program) that is stored in memory medium 125. The purpose of the attract loop is to entice individual(s) into a predetermined area so that the sentient unit can detect and characterize them. Typically such an attract loop may comprise an interesting video displaying products and/or the use of the products. An audio sound track may also be included with attractive music, a popular tune, or the like. The attract loop may simply display video or still imagery and optional audio which align with the brand or brands associated with the location of the display. For example, outdoor adventure content may be displayed in a sporting goods store. Once an individual is detected in step 210 in the predetermined area in the vicinity of the sentient system 100, the system 100 then collects appropriate data at step 220 about the individual using one or more capture devices to capture, for example, images of the individual and any sound information coming from the individual. The system 100 may detect the presence of an individual through the use of a motion detection device or by changes detected in the field of view of an image capture device 130. Next, at classification step 230, the system attempts to classify the individuals detected based upon features derived from the collected data. Examples of features derivable from the captured data are, but are not limited to, an individual's face or voice, the presence or absence of eyeglasses or facial hair on the individual's face, and the height of the individual. If sufficient data is available and features of the individual are able to be determined, then the appropriate algorithms are run by CPU 105 which classify the individual into as many classifications as possible with respect to the features obtained. For example, the age range and gender of the individual(s) may be determined.

The classification(s) determined in step 230 along with the current operating conditions 260 are passed on to CPU 105 where at decision step 270 the new information along with previously obtained classification information is used to determine whether or not to modify the current informational material being played to the individual observing the sentient display device 110. Thus it can be seen the system 100 can dynamically change the program being displayed based on current obtained data/information.

Figures 5, 6:
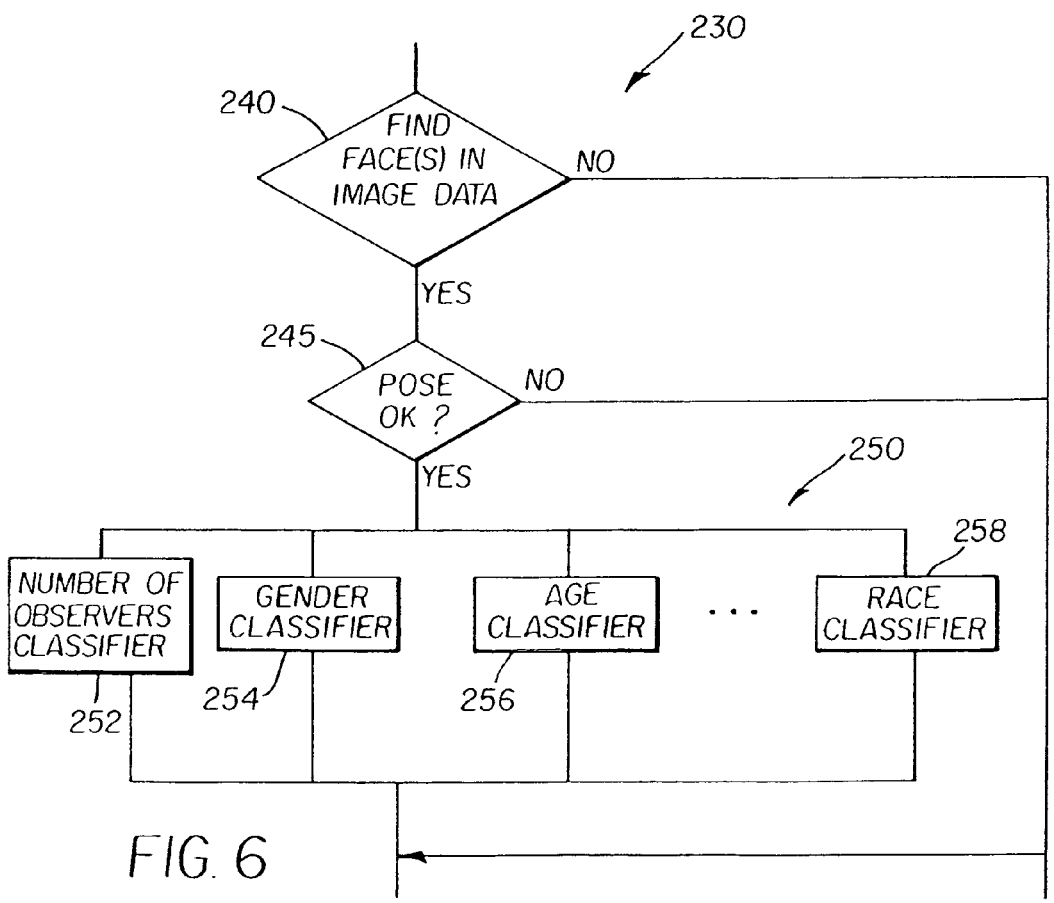
FIG. 5 is a table showing a decision chart useful in the practice of the present invention.
FIG. 6 is a flow chart providing additional detail of a particular step shown in FIG. 4.

Referring to FIG. 5, there is shown an example of a gender/age decision chart used to determine which informational program to play based upon classification information determined in step 230. For example, if the classification step 230 determined that the viewer was a female over the age of fifty, a stored informational program E would be the selected program to implement. If the age and gender of the individual could not be determined, the information display program would be program I. The informational program determined from the decision chart in step 270 could further be modified or changed based upon the current operating conditions determined at step 260. It is to be appreciated that the decision chart shown in FIG. 5 can be modified to take into account different or more than two attributes of the individual than are shown in FIG. 5. Finally, the system 100 displays the selected information material to the individual(s) observing at step 280.

Current operating conditions may include a variety of factors that are determined at step 260. Example of various factors include the time of day 290, the date and/or day of the week 300, the location data 310 of the sentient system 100, the level of people traffic data 320 around the sentient unit 100, and current sales data 330 being collected from various devices such as cash registers. In addition, other operating conditions may include predetermined data such as current sale promotions 340 and known historical distribution patterns 350 of individuals in the intermediate area around the sentient system 100 can also be used to determine whether and how to modify the current informational material being played to the individual(s).

Known historical shopper distribution patterns 350 correspond to predetermined information about the characteristics of the mostly likely individual(s) to be present at the sentient system 100 based upon its location, time, date, and day of the week. For example, by observation it can be determined that for a specified sentient system on a non-holiday weekday between time t1 and time t2 the most likely individual would be a woman over the age of 50 and between time t3 and time t4 the most likely individual(s) would be a woman and/or man between the ages of 30–45.

If no individuals are detected in the predetermined area around the sentient system 100 the unit queries for the then current operating conditions 260. This revised current operation information is passed into a decision step 270 where the revised current operation information along with previously obtained information is used to determine whether and/or how to modify the current informational material being played to the individual(s). At this point the sentient system 100 may choose to display an attract loop to entice potential individual(s) into the predetermined area.

As previously discussed at step 230 the classification of the individual(s) is determined. Step 230 is an important aspect of personalizing the display of system 100 to the individual(s). The following discussion provides a more detailed explanation concerning step 230. As previously discussed, once the presence of an individual is detected at step 210, at the next step 220 appropriate data concerning the individual is collected. Typically, the data collected will include image and sound data and, if the system is configured with more than one image capture device, then multiple pictures of the predetermined area where the individual is detected are captured.

Turning now to FIG. 6, there are provided additional details regarding the classification step 230. The images captured, are first digitized, if they were not already captured in digital form, and then analyzed to detect the location of a feature such as any face in the image at step 240. If no faces are found then the CPU 105 of sentient system 100 proceeds to determining the current operating conditions 260. If a face is found, the pose of the face is determined at step 245 to see if the digital image is appropriate for classification. If an image of the individual was captured from more than one angle, as in the case where the system is fitted with more than one image capture device, then the image with the most suitable pose is selected. If the pose of the individual is found to be unsuitable in any of the images available, then the sentient system proceeds to determine the current operating conditions at step 260. A frontal pose where the individual is looking at the display image capture device 130 is preferred for the classification process. If the individual is not directly looking at the device 130 then his/her pose may not be appropriate for classification.

There are numerous algorithms available for detecting faces in images as described "Face Detection and Gesture Recognition" by M. -H. Yang and N. Ahuja, Kluwer Academic Publishers, 2001, ISBN 0792374096. In many of the algorithms the process of face detection and pose estimation are inherently coupled together. Therefore the process of face detection can also yield the pose estimation of the face. In cases where the face detection algorithm does not yield the pose, a pose estimation algorithm can be used to determine the pose of the located face. Examples of pose estimation can be found in and references within S. Gong and S. McKenna, "Real-time face pose estimation," *International Journal on Real Time Imaging*, Special Issue on Real-time Visual Monitoring and Inspection, Vol. 4, pp. 333–347, 1998.

In the classification step 250 the classification algorithms being used by sentient system 100 attempts to classify the individuals based upon the characteristics of the individual(s). The classification stage is composed of one or more classifiers. In a preferred embodiment these classifications correspond to the number classifier 252, gender classifier 254, age classifier 256 and race classifier 258 of the individuals in the predetermined area.

Algorithms used for actual classifications are known in the art as classifiers and are typical learning algorithms for pattern classification and regression. By training the classifiers with ground truth data and reference samples of correctly classified patterns, the classifiers learn relationships that are common between the inputs of different class. Once trained, the classifiers can then take new input patterns and assign class labels to input patterns. Some classifiers not only assign class labels but also assign a measure of the belief or certainty that the input pattern belongs to a given class. For classifiers that assign a measure of the belief or certainty to an input pattern, the classifier typically maps the input to the real interval [0.0,1.0] where 0.0 represents absolute (complete) non-membership and 1.0 representing absolute (complete) membership, and values in between represent intermediate membership to a class. Examples of classifiers useful for practicing this invention are traditional algorithms such as linear, quadratic, Fisher Linear Discriminant, and Nearest Neighbor algorithms. More recently developed classifiers employ newer techniques such as Radial Basis Function (RBF) networks, large ensemble-RBF classifiers and Support Vector Machine classifiers. For the current invention, input patterns would be derived from the features of facial images and the classifiers would be trained with images of faces that are correctly classified according to the desired classification.

The number classifier 252 operates by simply counting the number of face features detected in step 240. An example of a gender classification 254 using different classifiers is described in B. Moghaddam and M. H. Yang, "Gender Classification with Support Vector Machines" in *Proc. of 4th IEEE Int'l Conf. on Face & Gesture Recognition*, March 2000.

Any voice-related feature derived from audio data captured during the data collection step 220 can also be useful in determining gender of the individual(s) viewing the sentient display. For example, in U.S. Pat. No. 5,953,701 issued to Neti and Roukos disclose a method for determining the gender of a speaker from voice analysis.

Typical classifiers for age classification 256 operate by performing an analysis of a digital image of a subject's face for particular detailed facial features such as facial feature ratios and wrinkle analysis. An age classifier useful for the practice of the present invention is disclosed in U.S. Pat. No. 5,781,650 issued to Lobo and Kwon.

An automatic estimate of the height feature of the individual viewing the sentient display may also be made in certain instances, and this information can be useful in improving the estimate of the age of the viewing individual. As described in FIG. 1, an infrared or sonar ranging device may be employed as a motion sensor 120 and this ranging device may also be used to provide an estimate of the distance of the viewing individual from the sentient display. Once an image of the face of the viewing individual has been captured, step 220 from FIG. 4, the position of the face in the captured image may be measured for example, by means of a calibrated reticule in the field of the image capture device 130, and this position information taken together with the range information may be used to provide an estimate of the height of the individual. Combining height information for the viewing individual with an analysis of age from facial features as described above allows a more certain determination of the classification of the viewing individual. For example, height information combined with age classification information determined as described above would allow the system to distinguish between a tall child (teenager) and an adult of shorter than average stature.

Step 270 of FIG. 4 is the step where characteristics of the individual(s) determined in step 230, along with the current operating conditions 260 and previously obtained information is used to determine whether or not to modify the current informational material being played to the individual observing the sentient system 100. The sum of the input data to decision step 270 can possess uncertainty. For example, the true characteristics of the individuals may not be absolutely known.

There are numerous ways of combining input data that possess uncertainty to generate an optimal output. Decision support systems are computer programs designed to improve the process and outcome of decision making. So-called intelligent decision support systems use artificial intelligence techniques to make the optimal selections or decisions when the information is incomplete or uncertain. Fuzzy logic (reasoning) and Bayesian probability networks are two useful ways of combining information in a decision support system useful in the decision step 270 in selecting the appropriate informational material. By cascading the belief values (or probabilities) for membership in a particular class, it is possible to generate a more robust determination of the appropriate informational program to display to the individual. Use of both fuzzy logic techniques and Bayesian networks are well known. Typical examples of fuzzy logic decision support systems that support decision making where there is a degree of uncertainty are disclosed in U.S. Pat. Nos. 5,267,348 and 6,282,526 and the references cited therein. Examples of Bayesian network techniques applied to uncertain decision making are disclosed in U.S. Pat. Nos. 5,802,256 and 6,076,083 and the references cited therein.

In order to more clearly understand the operation of the present invention, examples of how a sentient advertising display system operates will now be provided.

In a first example, a sentient advertising system 100 is housed in a kiosk and is located in a popular shopping mall at a sports clothing store. It is mid-afternoon on a school day and the system 100 recognizes this is about the time when shoppers from the local high school may be arriving at the shopping mall. This understanding is based not only upon the time of day, but also on stored historical data on shopper demographics throughout the day for this shopping mall. The system 100 selects an attract loop designed for teen-age individuals featuring an up tempo music video with young people dancing. An individual passing the kiosk stops momentarily to watch the video. The motion detection algorithm running on the system CPU 105 detects a change in the field of view of one of the system's digital cameras 130 aimed at the area in front of the kiosk, and the attract loop shifts into an eye-catching video of abstract colors and shapes swirling to hold the attention of the potential viewer. Additional images of the individual are captured, and the face finding function of the system is activated and determines that a suitable pose has been captured. The number, race, gender and age classification algorithms run and it is determined within an approximately 60–80% probability range that the viewer is a teenage Asian boy approximately 12–15 years of age. Since the age range fits well with the historical demographic shopper data for this location, the system 100 proceeds to consult stored information regarding items which have been selling well in the recent past to this demographic group as well as current store promotions. Based upon all this information, the system 100 selects an informational program relating to a particular trendy style of blue jeans popular with teen boys and currently on sale. The information includes a video demonstrating the product along with where the product may be found in the store and the sale price.

In a second example, a sentient advertising system 100 having a large-screen is installed in a shopping mall in a central location where there are many other advertising displays competing for shoppers' attention. The sentient display features a very high quality plasma display device which is visually striking and also features an Audio Spotlight© sound system which serves to attract potential viewers because of the novelty and/or quality of this type of sound system. Potential viewers enjoy walking in and out of the field of the sound coverage to experience the highly directed sound program. A group of individuals approaches the system 100 and their presence is detected by the system's infrared ranging motion detector. Several cameras 130 associated with the system 100 are activated and provide images of the area in front of the display device 110 from several angles and fields of view. The number classifier quickly determines that there are four individuals in front of the display. Useable poses have been captured and the age classifier determines there are two adults and two children in the group within an overall probability of 75%. Gender classification determines also to a reasonable probability that the two adults are male and female and the system makes an inference that a family group is viewing the display. On this basis, the system 100 selects a multi-media program with video and sound promoting a new family entertainment center that recently opened in the mall. The information includes a map showing the route to the center and directs the group to pick up a coupon for the center at the stored in bracket on the wall near the display.

The invention has been described in detail with particular reference to certain preferred embodiments thereof, but it will be understood that variations and modifications can be effected within the scope of the invention.

PARTS LIST

100 sentient system
105 CPU
110 display device
120 motion sensor
125 storage medium
130 image capture device
135 audio output device
136 kiosk
140 audio input device
145 communication channel
150 cash register
155 server
160 database
165 electronic billboard
170 frame
200 step
205 step
210 step
220 step
230 classification step
240 step
245 step
250 classification step
252 number classifier
254 gender classifier
256 age classifier
258 race classifier
260 current operating conditions
270 step
280 step
290 time of day data
300 date data
310 location data
320 people traffic data
330 current sales data
340 sales promotion data
350 distribution patterns

What is claimed is:

1. A method for selecting an informational material program from a plurality of said informational programs available in a presentation system, comprising the following steps:
   a) sensing the presence of at least one individual in a predetermined area;
   b) determining at least one characteristic selected from the group consisting of age, gender, race, demographics, psychographics, cohort group, and identity of said at least one individual without user interaction for classification of said at least one individual;
   c) selecting one of said plurality of informational material programs based upon said classification; and
   d) presenting said selected informational material program by said system.

2. The method of claim 1 wherein said step of sensing the presence of said at least one individual further comprises detecting motion of the at least one individual using a motion detecting device.

3. The method of claim 1 wherein said step of sensing the presence of said at least one individual further comprises the steps of:
   a) capturing an image of a said predetermined area with a digital image capture device; and
   b) detecting a change in the field of view of said digital image capture device using a change detection algorithm.

4. The method of claim 1 wherein said step of determining at least one characteristic of said at least one individual further comprises the steps of:
   a) capturing an image of said at least one individual using a digital image capture device;
   b) finding a feature in said captured image;
   c) determining if said feature is of sufficient quality for classification; and
   d) classifying said feature using at least one classification algorithm.

5. The method according to claim 4 wherein said feature comprises the face of said individual.

6. The method of claim 5 further comprising a step of determining the number of said individuals by counting the number of said faces found.

7. The method according to claim 4 wherein said feature comprises the voice of said individual.

8. The method according to claim 4 wherein said feature is classified in accordance with at least one of the following classifications: gender, age, and race.

9. The method of claim 1 wherein the step of determining at least one characteristic of said at least one individual further comprises the steps of:
   a) capturing an audio recording of said at least one individual's voice; and
   b) determining the gender of said at least one individual using a voice classification algorithm.

10. The method of claim 1 wherein said step of determining at least one characteristic of said at least one individual further comprises automatically estimating the height of said individual.

11. The method of claim 1 wherein the step of presenting said selected informational material program further comprises presenting at least one type of information selected from the group consisting of still images, motion images, and audio.

12. The method of claim 1 further comprising determining at least one characteristic from the group consisting of the individual's face, voice, the presence or absence of eyeglasses, the presence or absence of hair on the individual's face, and the height of the individual.

13. A method for selecting an informational material program from a plurality of said informational programs available in a presentation system, comprising the following steps:
   a) sensing the presence of at least one individual in a predetermined area;
   b) determining at least one characteristic from the group consisting of age, gender and race of the individual without user interaction for classification of said at least one individual;
   c) selecting one of said plurality of informational material programs based upon said classification of said at least one individual and at least one type of information selected from the group consisting of time, date, location, historical customer traffic data, sales data and sales promotion data; and
   d) presenting said selected informational material program on a display unit.

14. The method of claim 13 wherein said step of selecting one of said plurality of informational programs further comprises combining said at least one characteristic of said at least one individual with said other information using fuzzy logic reasoning.

15. The method of claim 13 wherein said step of selecting one of said plurality of informational programs further comprises combining said at least one characteristic of said at least one individual with said other information using Bayesian probability networks.

16. A system for displaying an informational material program selected from a plurality of informational material programs based upon a characteristic of an individual, consisting of:
   a) a control unit storing said plurality of programs;
   b) a display unit capable of displaying said informational material programs;
   c) one or more sensors for determining the presence of at least one individual in a predetermined area and for determining a characteristic from the group consisting of age, gender, race, demographics, psychographics, cohort group, and identity of said at least individual without user interaction for classification of said at least one individual; and
   d) said control unit selecting one of said plurality of informational material programs based upon the presence and said classification of said individual in said predetermined area.

17. A system according to claim 16 wherein said display unit further comprises devices for the display of both visual imagery and reproduction of sound.

18. A system according to claim 17 wherein said device for the reproduction of sound further comprises an directional sound system.

19. A system according to claim 16 further comprising a user input device for the purpose of interacting with the system.

20. A software program for selecting an informational material program from a plurality of said informational programs available in a presentation system such that when loaded on a computer will cause said computer to do the steps of:
   a) sensing the presence of at least one individual in a predetermined area;
   b) determining at least one characteristic from the group consisting of age, gender, race, demographics, psychographics, cohort group, and identity of said at least one individual without user interaction for classification of said at least one individual;
   c) selecting one of said plurality of informational material programs based upon said classification; and
   d) presenting said selected informational material program by said system.

* * * * *